United States Patent
Oh et al.

(10) Patent No.: US 10,057,633 B2
(45) Date of Patent: Aug. 21, 2018

(54) METHOD AND APPARATUS FOR TRANSMITTING AND RECEIVING ULTRA HIGH-DEFINITION BROADCASTING SIGNAL FOR EXPRESSING HIGH-QUALITY COLOR IN DIGITAL BROADCASTING SYSTEM

(71) Applicant: LG ELECTRONICS INC., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 14/903,820

(22) PCT Filed: Jul. 14, 2014

(86) PCT No.: PCT/KR2014/006301
§ 371 (c)(1),
(2) Date: Jan. 8, 2016

(87) PCT Pub. No.: WO2015/008987
PCT Pub. Date: Jan. 22, 2015

(65) Prior Publication Data
US 2016/0156965 A1 Jun. 2, 2016

Related U.S. Application Data

(60) Provisional application No. 61/846,066, filed on Jul. 14, 2013.

(51) Int. Cl.
*H04N 21/438* (2011.01)
*H04N 19/46* (2014.01)
(Continued)

(52) U.S. Cl.
CPC ......... *H04N 21/4382* (2013.01); *H04N 19/46* (2014.11); *H04N 19/70* (2014.11);
(Continued)

(58) Field of Classification Search
None
See application file for complete search history.

(56) References Cited

U.S. PATENT DOCUMENTS

| 9,591,257 B2* | 3/2017 | Oh ........................ H04N 7/0117 |
| 2007/0081103 A1* | 4/2007 | Ahn ........................ H04N 9/73 |
| | | 348/655 |

(Continued)

FOREIGN PATENT DOCUMENTS

| EP | 2538683 A2 | 12/2012 |
| EP | 2928198 A1 | 10/2015 |

(Continued)

OTHER PUBLICATIONS

International Standard, Second Edition Jun. 1, 2013, Information technology—Media context and control Part 5: Data formats for interaction devices, "ISO/IEC FDIS 23005-0:2013(E)", Feb. 22, 2013 p. 38-45.

(Continued)

*Primary Examiner* — Alexander Q Huerta
(74) *Attorney, Agent, or Firm* — Dentons US LLP

(57) ABSTRACT

The present invention relates to a method and an apparatus for transmitting and receiving an ultra high-definition broadcasting signal for expressing high-quality color in a digital broadcasting system. An apparatus for receiving an ultra high-definition broadcasting signal according to one embodiment of the present invention comprises: a receiving unit for receiving an ultra high-definition broadcasting signal which includes ultra high-definition broadcasting contents and display information metadata representing display (Continued)

environment information suitable for the ultra high-definition broadcasting contents; a decoder for decoding the received ultra high-definition broadcasting contents and the display information metadata; a controlling unit for adjusting the display environment of the receiving apparatus to a display environment suitable for the ultra high-definition broadcasting contents using the display information metadata; and a reproducing unit for reproducing the ultra high-definition broadcasting contents.

16 Claims, 8 Drawing Sheets

(51) Int. Cl.
H04N 19/70 (2014.01)
H04N 21/434 (2011.01)
H04N 21/426 (2011.01)
H04N 21/6336 (2011.01)

(52) U.S. Cl.
CPC ... H04N 21/42676 (2013.01); H04N 21/4345 (2013.01); H04N 21/6336 (2013.01)

(56) References Cited

U.S. PATENT DOCUMENTS

| | | | | |
|---|---|---|---|---|
| 2007/0256109 | A1* | 11/2007 | Kwak | H04N 5/4401 725/95 |
| 2008/0178246 | A1* | 7/2008 | Blanchard | H04N 7/0122 725/131 |
| 2008/0297456 | A1* | 12/2008 | Marcu | G09G 3/2003 345/88 |
| 2009/0002404 | A1 | 1/2009 | Bamhoefer et al. | |
| 2009/0147021 | A1 | 6/2009 | Glen | |
| 2010/0033627 | A1 | 2/2010 | Hayashi et al. | |
| 2010/0325676 | A1* | 12/2010 | Kim | H04N 21/238 725/105 |
| 2012/0281010 | A1* | 11/2012 | Kim | H04N 9/67 345/590 |
| 2012/0315011 | A1* | 12/2012 | Messmer | H04N 21/8358 386/230 |
| 2012/0321273 | A1* | 12/2012 | Messmer | G11B 27/031 386/224 |
| 2013/0083838 | A1* | 4/2013 | Touze | H04N 5/2355 375/240.01 |
| 2013/0235072 | A1* | 9/2013 | Longhurst | H04N 1/46 345/605 |
| 2013/0271568 | A1* | 10/2013 | Park | H04N 21/4345 348/43 |
| 2013/0314495 | A1* | 11/2013 | Chen | H04N 13/0048 348/43 |
| 2014/0146229 | A1* | 5/2014 | Hsiao | H04N 5/44591 348/441 |
| 2014/0298377 | A1* | 10/2014 | Robinson | H04N 21/440263 725/31 |
| 2015/0296232 | A1* | 10/2015 | Hwang | H04N 21/234327 348/473 |
| 2015/0358651 | A1* | 12/2015 | Hwang | H04N 21/2362 725/54 |
| 2015/0382024 | A1* | 12/2015 | Oh | H04N 7/015 375/240.25 |
| 2016/0005201 | A1* | 1/2016 | Kunkel | H04N 9/67 345/589 |
| 2016/0345040 | A1* | 11/2016 | Oh | H04N 21/2343 |

FOREIGN PATENT DOCUMENTS

| | | |
|---|---|---|
| JP | 3851615 B2 | 11/2006 |
| KR | 10-2008-0024392 A | 3/2008 |
| WO | 2008032930 A1 | 3/2008 |
| WO | 2012012489 A2 | 1/2012 |
| WO | 2012054143 A1 | 4/2012 |
| WO | 2012169204 A1 | 12/2012 |
| WO | 2013-006001 A2 | 1/2013 |
| WO | 2013021655 A1 | 2/2013 |
| WO | 2013046096 A1 | 4/2013 |
| WO | 2014084564 A1 | 6/2014 |

OTHER PUBLICATIONS

Flynn, D., et al., "High Efficiency Video Coding (HEVC) Range Extensions text specification: Draft 3", Jun. 21, 2013, Joint Collaborative Team on Video Coding (JCT-VC) of ITU-T SG 16 WP 3 and ISO/IEC JTC 1/SC 29/WG 11.

Hattori, S. et al., "Signalling of Luminance Dynamic Range in Tone mapping information SEI", Joint Collaborative Team on Video Coding (JCT-VC) of ITU-T SG 16 WP 3 and ISO/IEC JTC 1/SC 29/WG 11, JCTVC-J0149, XP030112511.

Hattori, S. et al., "HLS: SEI message for transfer function information", Joint Collaborative Team on Video Coding (JCT-VC) of ITU-T SG 16 WP 3 and ISO/IEC JTC 1/SC 29/WG 11, JCTVC-O0064, XP030115040.

* cited by examiner

FIG. 2

| sei_payload( payloadType, payloadSize ) { | Category | Descriptor |
|---|---|---|
| ... | | |
| if( payloadType = = 52 ) | | |
| color_management_info(payloadSize) | 5 | |

FIG. 3

| color_management_info(payloadSize) { | C | Descriptor |
|---|---|---|
| white_adjustment_flag | | |
| gamut_mapping_flag | | |
| reference_black_luminance_level | | |
| reference_white_luminance_level | | |
| EOTF_gamma | | |
| reference_white_color_temperature | | |
| color_gamut | | |
| if(white_adjustment_flag == 1){ | | |
| white_primary_x | | |
| white_primary_y | | |
| } | | |
| if(gamut_mapping_flag== 1){ | | |
| color_primary_r_x | | |
| color_primary_r_y | | |
| color_primary_g_x | | |
| color_primary_g_y | | |
| color_primary_b_x | | |
| color_primary_b_y | | |
| number_of_coeff | | |
| for(i=0; i<number_of_coeff; i++) | | |
| gamut_mapping_coeff[i] | | |
| } | | |
| } | | |

FIG. 4

| Bit depth | Sub-range | Bit depth |
|---|---|---|
| 8 | sub black | 1 – 15 |
|  | reference range | 16 – 235 |
|  | super white | 236 - 254 |
| 10 | sub black | 4 – 63 |
|  | reference range | 64 - 940 |
|  | super white | 941 - 1019 |
| 12 | sub black | 16 - 255 |
|  | reference range | 256 - 3760 |
|  | super white | 3761 - 4079 |

FIG. 5

| bit stream | Color temperature | CIE 1931 chromaticity | |
|---|---|---|---|
|  |  | x | y |
| 0000 | D65 | 0.3127 | 0.3290 |
| 0001 | 9300K | 0.2831 | 0.2971 |
| 0010-1000 | reserved |  |  |
| 1001-1111 | User private |  |  |

FIG. 6

| bit stream | Color gamut | Notes |
|---|---|---|
| 0000 | BT. 709 |  |
| 0001 | DCI-P3 |  |
| 0010 | BT. 2020 |  |
| 0011-1000 | reserved |  |
| 1001-1111 | User private |  |

FIG. 7

| Syntax | No. of Bits | Format |
|---|---|---|
| event_informaion_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j<num_events_in_section; j++_ { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N; i++) { | | |
|             descriptor() | | |
|         } | | |
|     } | | |
|     CRC_32 | 32 | rpchof |
| } | | |

FIG. 8

| Syntax | No. of bits | Format |
|---|---|---|
| UHD_color_management_info_descriptor ( ) { | | |
|     descriptor_tag | 8 | uimsbf |
|     descriptor_length | 8 | uimsbf |
|     reserved | 4 | |
|     number_of_color_info | 4 | |
|     for(i=0; i<number_of_color_info; i++) { | | |
|         color_management_metadata () | | |
|     } | | |
| } | | |

FIG. 9

| color_management_metadata () { | No. of bits | Format |
|---|---|---|
|     gamut_mapping_flag | | |
|     reference_black_luminance_level | | |
|     reference_white_luminance_level | | |
|     color_gamut | | |
|     if(gamut_mapping_flag == 1){ | | |
|         color_primary_r_x | | |
|         color_primary_r_y | | |
|         color_primary_g_x | | |
|         color_primary_g_y | | |
|         color_primary_b_x | | |
|         color_primary_b_y | | |
|     } | | |
| } | | |

FIG. 10

| Syntax | No. of bits | Format |
|---|---|---|
| UHD_program_info_descriptor ( ) { | | |
|     descriptor_tag | 8 | uimsbf |
|     descriptor_length | 8 | uimsbf |
|     UHD_service_type | 4 | uimsbf |
|     Reserved | 4 | |
| } | | |

FIG. 11

| UHD_service_type | Examples |
|---|---|
| 0000 | UHD1 |
| 0001 | UHD2 |
| 0010-0111 | Reserved |
| 1000-1111 | User_private |

FIG. 12

| Syntax | No. of Bits | Format |
|---|---|---|
| terrestrial_virtual_channel_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_channels_in_section | 8 | uimsbf |
|     for (j=0; i<num_channels_in_section; i++_ { | | |
|         short_name | 7*16 | '11' |
|         reserved | 4 | uimsbf |
|         major_channel_number | 10 | uimsbf |
|         minor_channel_number | 10 | '11' |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++) { | | |
|             descriptor() | | |
|         } | | |
|     } | | |

| Service scenario | service _type | Descriptors |
|---|---|---|
| UHD | 0x07 | Component list descriptor<br>Service location descriptor<br>UHD descriptor |
| | 0x09 | Component list descriptor<br>Parameterized service descriptor<br>Service location descriptor |
| | 0x10 | UHD descriptor<br>Service location descriptor |

METHOD AND APPARATUS FOR TRANSMITTING AND RECEIVING ULTRA HIGH-DEFINITION BROADCASTING SIGNAL FOR EXPRESSING HIGH-QUALITY COLOR IN DIGITAL BROADCASTING SYSTEM

This application is a National Stage Entry of International Application No. PCT/KR2014/006301, filed on Jul. 14, 2014, and claims the benefit of and priority to Provisional Application No. 61/846,066, filed on Jul. 14, 2013, each of which are hereby incorporated by reference in their entirety for all purposes as if fully set forth herein.

TECHNICAL FIELD

The present invention relates to a broadcast system, and more particularly to a method and/or apparatus for transmitting and receiving an ultra high-definition (UHD) broadcast signal for expressing a high-quality color in a digital broadcast system.

BACKGROUND ART

With the increasing development of digital technology and communication technology, multimedia contents based on audio/video (A/V) data have rapidly come into widespread use in various technical regions (e.g., broadcasts, movies, Internet, personal media, etc.) and the number of users who desire to use the multimedia contents is also rapidly increasing. In addition, with widespread use of 3DTV/3D movies capable of providing users with the stereoscopic three-dimensional (3D) effect, the demand of users who desire to use immersive media capable of providing the users with the 3D effect and stereo sound is rapidly increasing. In addition, as the TV screen is gradually increased in size in proportion to the increasing development of display technology, the number of users who desired to high-quality content such as high definition (HD) content is also rapidly increasing. Therefore, many developers and companies are conducting intensive research into technology of immersive broadcasting TVs (such as 3DTVs and UHDTVs (Ultra High Definition TVs)) as the next generation broadcast services to prepare for the Post-HDTV marketing. Specifically, in recent times, various researches for UHD (Ultra High Definition) broadcast services have been intensively proposed.

UHD broadcasting aims to provide TV viewers with higher-quality images, higher-quality colors, and higher immersive sense in more various aspects than the conventional HD broadcasting. Therefore, UHD broadcast associated standard has recently been established to define wider color gamut than in the conventional TVs. UHD content can provide TV viewers with the best information similar to the original color directly obtained through HVS (Human Visual System), such that it can provide the TV viewers with higher-quality images and higher immersive sense. Although the current broadcast system is designed to perform various post-processing steps needed to implement color enhancement, prior to transmission of the content for optimum color implementation, the current broadcast system has difficulty in perfectly expressing various colors due to a difference in environment between the actual display environment of each user and the manufacturing environment of the content manufacturer.

The color expression range from among various elements needed to provide high-quality images in the UHD broadcasting has recently been extended. Therefore, technology of providing high-quality color images is of importance. However, whereas the manufacturer of the broadcast content uses various methods to reflect high-quality colors into the resultant image, the content receiving users may have relatively low-quality content displayed in unexpected colors different from original colors intended by the content manufacturer due to the presence of various types of receivers and display units having different product levels. As a result, the content receiving users unavoidably obtain different types of information according to different viewing environments, and the actually displayed colors are different from the desired colors intended by the content manufacturer, such that deteriorated images having relatively lower-quality colors in terms of color are actually applied to the TV viewers.

DISCLOSURE

Technical Problem

Accordingly, the present invention is directed to a method and/or apparatus for transmitting and receiving an ultra high-definition (UHD) broadcast signal that substantially obviates one or more problems due to limitations and disadvantages of the related art. An object of the present invention is to provide a method and/or apparatus for transmitting and receiving an ultra high-definition (UHD) broadcast signal capable of expressing a high-quality color.

Another object of the present invention is to provide a method and/or apparatus for transmitting and receiving an UHD broadcast signal capable of expressing an original color intended by a content manufacturer or distributor.

Another object of the present invention is to provide a method for adjusting a display environment of a receiver in such a manner that thee display environment can be optimized for the UHD broadcast content.

Technical Solution

The object of the present invention can be achieved by providing an apparatus for receiving an Ultra High Definition (UHD) broadcast signal including: a receiver configured to receive an UHD broadcast signal that includes UHD broadcast content and display information metadata indicating display environment information appropriate for the UHD broadcast content; a decoder configured to decode the received UHD broadcast content and the display information metadata; a controller configured to adjust a display environment of the receiving apparatus to another display environment appropriate for the UHD broadcast content using the display information metadata; and a reproduction unit configured to reproduce the UHD broadcast content.

The display information metadata may include at least one of minimum reference luminance information indicating minimum luminance from among a plurality of recommended display luminance ranges needed to reproduce the UHD broadcast content under an optimum display environment, maximum reference luminance information indicating maximum luminance from among a plurality of recommended display luminance ranges needed to reproduce the UHD broadcast content under the optimum display environment, and EOTF (Electro Optical Transfer Function) gamma index information indicating a gamma index used in an EOTF needed to calculate luminance appearing in the reproduction unit of the receiving apparatus.

The display information metadata may include at least one of reference achromatic color gamut information indicating position associated information on an achromatic color gamut dependent upon a predetermined color temperature, color temperature designation flag information indicating whether an arbitrary color temperature is designated, and arbitrary achromatic color gamut information indicating position associated information on the achromatic color gamut dependent upon an arbitrary color temperature when the arbitrary color temperature is designated.

The display information metadata may include at least one of gamut designation flag information indicating whether an arbitrary gamut is designated, reference gamut information indicating a standard color gamut indicating a color of content, arbitrary color gamut coordinates information indicating coordinates of red, green, and blue on an arbitrary color gamut when the arbitrary color gamut instead of the standard color gamut is designated, coefficient number information indicating the number of coefficients used in conversion when the conversion to the arbitrary color gamut on the basis of the standard color gamut is achieved, and gamut mapping coefficient information indicating a coefficient used for conversion to the arbitrary color gamut.

The display information metadata may be contained in a supplemental enhancement information (SEI) message and then transmitted, or is contained in an event information table (EIT) including information regarding each event constructing UHD broadcast content and then transmitted.

The display information metadata may be contained in an event level descriptor that describes information applied to each event in the event information table (EIT), and then transmitted.

The event information table (EIT) may further include: an UHD program information descriptor configured to identify an UHD broadcast service including the display information metadata.

In accordance with another aspect of the present invention, a method for transmitting an Ultra High Definition (UHD) broadcast signal includes: encoding not only UHD video data constructing an UHD broadcast content, but also display information metadata indicating display environment information appropriate for the UHD broadcast content; multiplexing the encoded UHD video data and the display information metadata; and transmitting the multiplexed UHD video data and the multiplexed display information data.

The display information metadata may include at least one of minimum reference luminance information indicating minimum luminance from among a plurality of recommended display luminance ranges needed to reproduce the UHD broadcast content under an optimum display environment, maximum reference luminance information indicating maximum luminance from among a plurality of recommended display luminance ranges needed to reproduce the UHD broadcast content under the optimum display environment, and EOTF (Electro Optical Transfer Function) gamma index information indicating a gamma index used in an EOTF needed to calculate luminance appearing in a display unit of a broadcast signal receiver.

The display information metadata may include at least one of reference achromatic color gamut information indicating position associated information on an achromatic color gamut dependent upon a predetermined color temperature, color temperature designation flag information indicating whether an arbitrary color temperature is designated, and arbitrary achromatic color gamut information indicating position associated information on the achromatic color gamut dependent upon an arbitrary color temperature when the arbitrary color temperature is designated.

The display information metadata may include at least one of gamut designation flag information indicating whether an arbitrary gamut is designated, reference gamut information indicating a standard color gamut indicating a color of content, arbitrary color gamut coordinates information indicating coordinates of red, green, and blue on an arbitrary color gamut when the arbitrary color gamut instead of the standard color gamut is designated, coefficient number information indicating the number of coefficients used in conversion when the conversion to the arbitrary color gamut on the basis of the standard color gamut is achieved, and gamut mapping coefficient information indicating a coefficient used for conversion to the arbitrary color gamut.

The display information metadata may be contained in a supplemental enhancement information (SEI) message and then transmitted, or is contained in an event information table (EIT) including information regarding each event constructing UHD broadcast content and then transmitted.

The display information metadata may be contained in an event level descriptor that describes information applied to each event in the event information table (EIT), and then transmitted.

The event information table (EIT) may further include: an UHD program information descriptor configured to identify an UHD broadcast service including the display information metadata.

Advantageous Effects

As is apparent from the above description, the embodiments of the present invention can receive and reproduce the UHD broadcast content similar to an objective color intended by the content manufacturer.

The embodiments of the present invention can adjust the display environment of the apparatus for receiving the UHD broadcast signal in such a manner that color similar to an objective color intended by the content manufacturer.

The embodiments of the present invention can provide a TV viewer with the optimum environment in which the content characteristics and the display characteristics of the receiving apparatus are considered.

The embodiments of the present invention can immediately transmit the intended purpose of the content supplied from the content manufacturer to the TV viewer.

DESCRIPTION OF DRAWINGS

FIG. 2 is a structural diagram illustrating a Supplemental Enhancement Information (SEI) message according to an embodiment of the present invention.

FIG. 3 is a conceptual diagram illustrating display information metadata (color_management_info(payloadSize)) contained in SEI ((Supplemental Enhancement Information) message and then transmitted according to an embodiment of the present invention.

FIG. 4 illustrates digital values of minimum reference luminance and digital values of maximum reference luminance, that are calculated by an EOTF (Electro Optical Transfer Function) function according to an embodiment of the present invention.

FIG. 5 illustrates coordinates of white_color based on each color temperature designated in CIE 1931 standard color gamut according to an embodiment of the present invention.

FIG. 6 illustrates a standard color gamut defined by reference gamut information (color_gamut) according to an embodiment of the present invention.

FIG. 7 illustrates an event information table (EIT) according to an embodiment of the present invention.

FIG. 8 illustrates the color management information descriptor (UHD_color_management_info_descriptor( )) according to an embodiment of the present invention.

FIG. 9 illustrates display information metadata (color_management_metadata( )) contained in the color management information descriptor (UHD_color_management_info_descriptor( )) according to an embodiment of the present invention.

FIG. 10 illustrates UHD program information descriptor according to an embodiment of the present invention.

FIG. 11 illustrates an UHD_service_type field contained in an UHD program information descriptor (UHD program_info_descriptor( )) according to an embodiment of the present invention.

FIG. 12 illustrates a Terrestrial Virtual Channel Table (TVCT) according to an embodiment of the present invention.

BEST MODE

Reference will now be made in detail to the embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
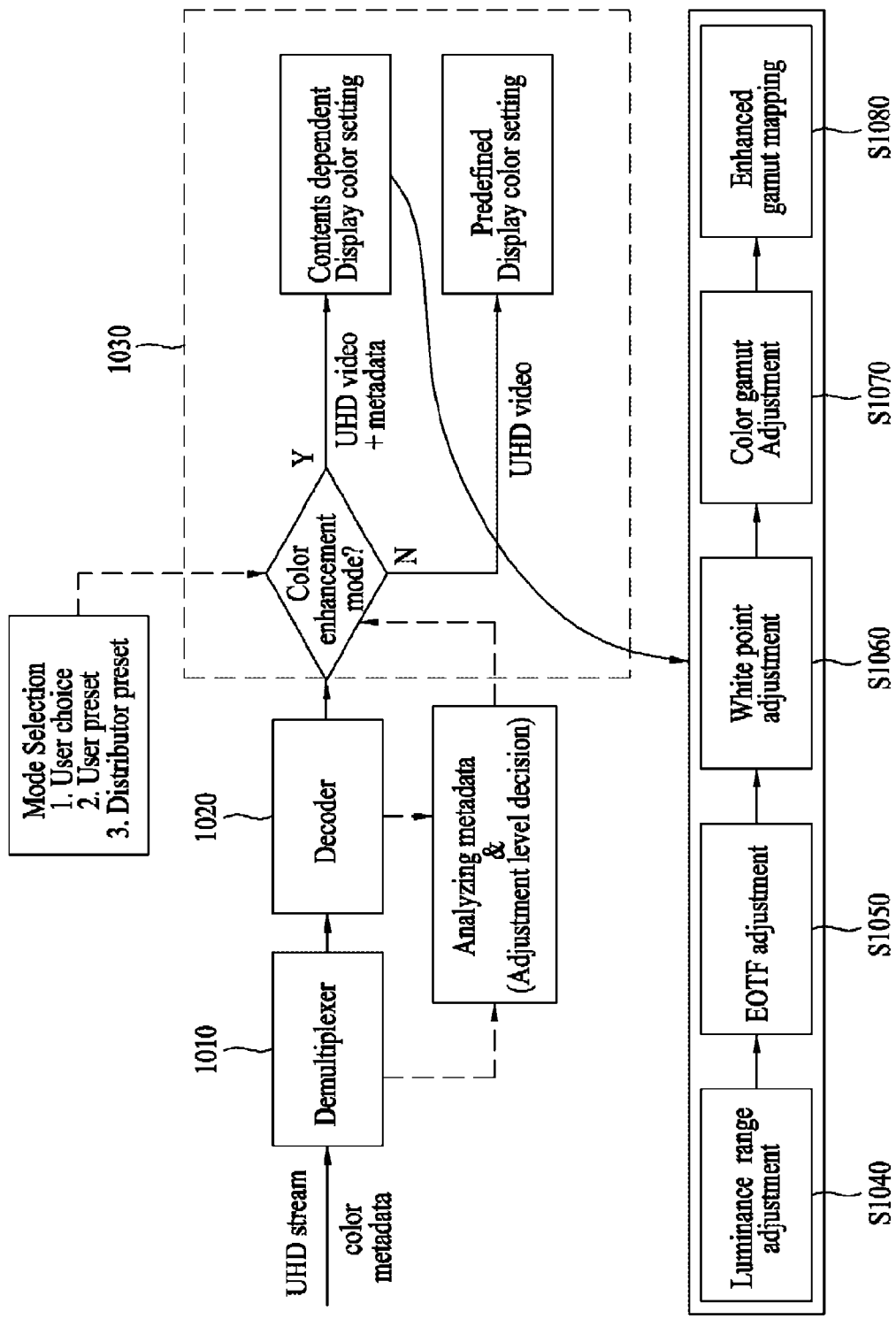
FIG. 1 is a flowchart illustrating the operations of an apparatus for receiving an UHD broadcast signal according to an embodiment of the present invention.

FIG. 1 is a flowchart illustrating the operations of an apparatus for receiving an UHD broadcast signal according to an embodiment of the present invention.

Referring to FIG. 1, the apparatus for receiving the UHD broadcast signal includes a demultiplexer 1010, a decoder 1020, and/or a controller 1030.

The demultiplexer 1010 may include a receiver (not shown) configured to receive an UHD broadcast stream and display information metadata indicating a display environment appropriate for the UHD broadcast content. The demultiplexer may demultiplex the multiplexed UHD broadcast stream into each elementary stream. For example, the elementary stream may include a video elementary stream for transmitting video data and an audio elementary stream for transmitting audio data. The display information metadata is multiplexed with media data such that the resultant data can be received as one UHD broadcast stream.

In this case, the multiplexed and received UHD broadcast stream may be demultiplexed to each elementary stream and/or display information metadata.

The decoder 1020 may decode media data transmitted from the demultiplexed elementary stream and/or display information metadata. The media data transmitted from the elementary stream may include UHD video data.

If the controller 1030 receives display information metadata through the receiving apparatus, the controller 1030 may decide whether to use information of the display information metadata. That is, the controller 1030 may determine whether the display environment of the receiving apparatus will be adjusted to another display environment appropriate for the received UHD broadcast content. The operation for determining whether the display environment will be adjusted can be selected by a user (i.e., TV viewer), and can also be automatically selected by the receiving apparatus. The determining whether the display environment will be adjusted may be implemented by a separate mode such as a color enhancement mode. The color enhancement mode may be predetermined using a preset function of a TV by the TV viewer. In this case, the display environment may be automatically adjusted without using an additional selection step. If the determining whether the display environment is predetermined using the preset function of the TV, this setting can be equally maintained even when a current channel switches to another channel. The color enhancement mode may be designated in the UHD broadcast content supply step. In this case, if the receiving apparatus supports the corresponding mode, the display environment can be automatically adjusted without using the additional selection step.

The controller may analyze the received display information metadata when determining whether to adjust the display environment, such that the display environment appropriate for the UHD broadcast content can be applied to the display unit of the receiving apparatus. In addition, it may be determined whether the display environment appropriate for the UHD broadcast content will be entirely or conditionally applied to the display unit of the receiving apparatus. In this case, in order to determine whether the display environment can be applied to the display of the receiving apparatus, it may be possible to use/transmit the display information metadata contained in the SEI message or the event information table (EIT). The applicable luminance level may be determined using minimum reference luminance information (reference_black_luminance_level) and or maximum reference luminance information (reference_white_luminance_level). The applicable color gamut may be determined using reference gamut information (color_gamut) and/or arbitrary gamut color gamut coordinates information (color_primary_r_x, color_primary_g_y, color_primary_g_x, color_primary_g_y, color_primary_b_x, color_primary_b_y). If the display of the receiving apparatus satisfies the luminance level information and the color gamut information, the display environments appropriate for the UHD broadcast content can be wholly applied. If only some parts are satisfies or if specific information is discarded by the TV viewer, the display environment can be optionally or conditionally applied. The display information metadata contained in the SEI message or the event information table (EIT) will hereinafter be described in detail.

The controller may control the receiving apparatus to inform the TV viewer of specific information indicating whether the display environment is adjusted through EPG (Electronic Program Guide) under a specific environment such as the reserved viewing environment. If the operation for adjusting the display environment is decided, the controller may allow the receiving apparatus to recognize the above decision such that the display environment can be automatically adjusted when the corresponding channel is displayed.

If the operation for using the color enhancement mode is decided, i.e., if the operation for adjusting the display environment of the receiving apparatus is decided, the controller may adjust the display environment of the receiving apparatus such that the display environment can be suitable for the UHD broadcast content received on the basis of the display information metadata, and the TV viewer can view the best or optimum viewing environment in which the best or optimum color is displayed. In this case, the display environment of the receiving apparatus can be adjusted in consideration of first characteristics related to Wide Color Gamut (WCG) of the UHD broadcast content and second characteristics related to the acceptable WCG of the display of the receiving apparatus. In other words, if the controller determines not to use the color enhancement mode, i.e., if the controller determines not to adjust the display environment of the receiving apparatus, the received UHD broadcast content can be reproduced in the display environment of the basically-configured receiving apparatus. In this case, the received display metadata may not be used.

If a current channel switches to another channel after completion of adjustment of the display environment of the receiving apparatus, the controller may control the receiving apparatus to recognize the display environment of the adjusted current channel. Therefore, if the channel returns to the current channel, assuming that the corresponding program is continuously displayed, the controller may provide the same display environment using again the recognized display environment.

When deciding to adjust the display environment of the receiving apparatus, the controller automatically changes luminance, color temperature, color gamut, etc. of the display unit, such that the display environment of the receiving apparatus can be adjusted to the optimum display environment in a manner that the TV viewer can view the UHD broadcast content. In this case, the operation for adjusting the display environment by the controller may include a luminance range adjustment step S1040, an EOTF adjustment step S1050, a white point adjustment step S1060, a reference gamut adjustment (or color gamut adjustment) step S1080.

In the luminance range adjustment step S1040, assuming that the minimum and maximum luminance range capable of being expressed by the display of the receiving apparatus can include minimum reference luminance information (reference_black_luminance_level) and maximum reference luminance information (reference_white_luminance_level) contained in the display information metadata, the controller may adjust the display luminance range of the receiving apparatus using the minimum reference luminance information and the maximum reference luminance information. In this case, information contained in the display information metadata may include contrast and luminance information instead of the minimum and maximum reference luminance information, and may also include gain and offset information. A detailed description of the minimum reference luminance information (reference_black_luminance_level) and the maximum reference luminance information contained in the display information metadata is as follows.

In the EOTF adjustment step S1050, the controller may adjust luminance that appears in a reproduction unit of the receiving apparatus using the EOTF gamma index information (EOTF gamma) contained in the display information metadata. EOTF (Electro-Optical Transfer Function; EOTF), acting a conversion function, may indicate the relationship between a digital input value and an output luminance value of the display unit, or may indicate the relationship between an input luminance value and an output digital value of the display unit. The above-mentioned EOTF gamma will hereinafter be described in detail.

In the white point adjustment step S1060, the controller may change a reference of color expression through adjustment of a reference white-and-block color of the display unit of the receiving apparatus. The controller may adjust a reference of color expression of the display unit of the receiving apparatus using reference white-and-block color gamut information (reference_white_color_temperature) or arbitrary white-and-block color gamut information (white_primary_x, white_primary_y) contained in the display information metadata. The reference white-and-block color gamut information (reference_white_color_temperature) and the arbitrary white-and-block color gamut information (white_primary_x, white_primary_y) will hereinafter be described in detail.

In the color gamut adjustment step S1070, the controller may change the color expression range and/or the reference color (red, green, blue) of the display unit of the receiving apparatus. If the color expression range of the UHD broadcast content contained in the display information metadata and/or the reference color information can be reproduced in the color expression range of the display unit of the receiving apparatus, the controller may adjust the color expression range and/or the reference color of the display unit of the receiving apparatus using the reference gamut information (color_gamut) contained in the display information metadata. A detailed description of the reference gamut information (color_gamut) is as follows.

In the color gamut conversion (or enhanced gamut mapping) step S1080, assuming that the display color expression range appropriate for the UHD broadcast content is insufficiently displayed through the reference gamut adjustment (color gamut adjustment) step S1070, the color expression range and/or reference color of the display of the receiving apparatus can be adjusted through the color gamut conversion step S1080. If arbitrary color gamut coordinates information (color_primary_r_x, color_primary_g_y, color_primary_g_x, color_primary_g_y, color_primary_b_x, color_primary_b_y) contained in the display information metadata indicates the color expression range acceptable by the display unit of the receiving apparatus, the mapping function may be constructed using gamut mapping coefficient information (gamut_mapping_coeff[i]) contained in the display information metadata, and the color gamut mapping is performed using the mapping function, such that the display color expression range and reference color of the receiving apparatus can be adjusted. The arbitrary color gamut coordinates information (color_primary_r_x, color_primary_g_y, color_primary_g_x, color_primary_g_y, color_primary_b_x, color_primary_b_y) and the gamut mapping coefficient information (gamut_mapping_coeff[i]) will hereinafter be described in detail.

The apparatus for receiving the UHD broadcast signal according to one embodiment of the present invention may include a reproduction unit (not shown) configured to reproduce the received UHD broadcast content under the display environment adjusted by the controller.

In accordance with one embodiment, assuming that a color gamut more appropriate for the received UHD broadcast content is provided under the adjusted display environment of the receiving apparatus, the controller may further perform the color gamut conversion process (i.e., enhanced gamut mapping) using the received display information metadata.

In accordance with one embodiment, assuming that the display environment of the receiving apparatus is adjusted (using the color enhancement mode), the receiving apparatus may not perform the image processing or enhancement processing as necessary.

FIG. 2 is a structural diagram illustrating a Supplemental Enhancement Information (SEI) message according to an embodiment of the present invention.

Referring to FIG. 2, the display information metadata (color_management_info(payloadSize)) according to one embodiment may be contained in payload of packets configured to transmit the SEI message and then transmitted.

FIG. 3 is a conceptual diagram illustrating display information metadata (color_management_info(payloadSize)) contained in SEI ((Supplemental Enhancement Information) message and then transmitted according to an embodiment of the present invention.

Referring to FIG. 3, display information metadata (color_management_info(payloadSize)) according to one embodiment may include color temperature designation flag information (white_adjustment_flag), gamut designation flag information (gamut_mapping_flag), minimum reference luminance information (reference_black_luminance_level), maximum reference luminance information (reference_white_luminance_level), EOTF gamma index information (EOTF gamma), reference achromatic color gamut information (reference_white_color_temperature), arbitrary achromatic color gamut information (white_primary_x, white_primary_y), reference gamut information (color_gamut), arbitrary gamut color gamut coordinates information (color_primary_r_x, color_primary_cy, color_primary_g_x, colocprimary_g_y, color_primary_b_x, colocprimary_b_y), coefficient number information (number_of_coeff and/or gamut mapping coefficient information (gamut_mapping_coeff[i]).

The color temperature designation flag information (white_adjustment_flag) may indicate whether there is a change in white color gamut coordinates when additional processing is performed to express the enhanced or high-quality color. If the color temperature designation flag information (white_adjustment_flag) field is set to the value of zero (0), there is no process for additional color enhancement. Alternatively, although the process for additional color enhancement exists, the white_adjustment_flag field may indicate that there is no change in white color gamut coordinates. If the color temperature designation flag information (white_adjustment_flag) field is set to the value of 1, this means that arbitrary white color gamut coordinates are used for additional color enhancement. The color temperature designation flag information (white_adjustment_flag) field may indicate whether an arbitrary color temperature instead of a predetermined reference color temperature is designated. In this case, the predetermined reference color temperature may indicate a color temperature defined in the standard color gamut such as CIE 1931.

The gamut designation flag information (gamut_mapping_flag) may indicate whether an enhanced gamut superior to a basic gamut is used. If the gamut designation flag information (gamut_mapping_flag) field is set to zero '0', this means that the basic standard gamut is used. If the field value is set to '1', this means that arbitrary gamut is used using arbitrary color gamut coordinates information to be described later. The gamut designation flag information may indicate whether or not an arbitrary gamut is designated.

The minimum reference luminance information (reference_black_luminance_level) may indicate minimum luminance from among the recommended display luminance ranges needed to reproduce UHD broadcast content under the optimum display environment. For example, a reference monitor may set the minimum reference luminance information (reference_black_luminance_level) to 0.05 cd/m^2. In this case, the value of 5 obtained when 100 (decimal number) is multiplied by the above value (0.05 cd/m^2.) may be transmitted in consideration of a general range. The above-mentioned minimum reference luminance information (reference_black_luminance_level) may indicate a minimum reference luminance expressed by the UHD broadcast content.

The maximum reference luminance information (reference_white_luminance_level) may indicate maximum luminance from among the recommended display luminance ranges needed to reproduce UHD broadcast content under the optimum display environment. For example, the reference monitor may set the maximum reference luminance information (reference_white_luminance_level) to 100 cd/m^2. In this case, the value of 1 obtained when the above value (100 cd/m^2) is divided by 100 (decimal number) may be transmitted in consideration of a general range. The above minimum reference luminance information (reference_white_luminance_level) may indicate maximum reference luminance expressed by the UHD broadcast content.

The EOTF gamma index information (EOTF gamma) may indicate a gamma index used in the EOTF (Electro Optical Transfer Function) configured to calculate luminance or brightness appearing in the reproduction unit of the receiving apparatus. For example, assuming that the ITU-R BT.1886 standard is used as a reference, luminance (L, cd/m^2) appearing in the screen may be denoted by the following expression 1. The following expression 1 may be referred to as the EOTF equation.

$$L = a(\max[V+b),0])^\gamma \quad \text{Expression 1}$$

In Expression 1, "L" may denote luminance appearing in the screen, "L_W" may denote a digital value corresponding to a maximum value of a reference luminance, "L B" may denote a digital value corresponding to a minimum value of the reference luminance, "V" may denote the value of a video signal normalized to any of values interposed between 0 and 1, "a" may denote a gain, and "b" may denote an offset.

$$a = (L_W^{1/\gamma} - L_B^{1/\gamma})^\gamma \quad \text{[Expression 2]}$$

$$b = \frac{L_B^{1/\gamma}}{L_W^{1/\gamma} - L_B^{1/\gamma}} \quad \text{[Expression 3]}$$

In Expressions 2 and 3, "L_B" may be denoted by "L=L_B" when "V=O" is applied to the above-mentioned EOTF equation. "L_W" may be denoted by "L=L_W" when "V=1" is applied to the above-mentioned EOTF equation. The EOTF gamma index information (EOTF gamma) may be denoted by an EOTF curve coefficient.

The reference achromatic color gamut information (reference_white_color_temperature) may indicate the position associated information on an achromatic color gamut according to a predetermined color temperature. The above-mentioned reference achromatic color gamut information may include specific information capable of estimating the coordinates on the achromatic color gamut. The reference achromatic color gamut information (reference_white_color_temperature) may be used as a reference of color compensation. In this case, a detailed description of the predetermined color temperature is as follows.

Assuming that an arbitrary color temperature instead of a predetermined reference color temperature (i.e., predetermined color temperature) is designated, the arbitrary achromatic color gamut information (white_primary_x, white_primary_y) may indicate the position associated information on the achromatic color gamut according to the arbitrary color temperature. The above-mentioned arbitrary achromatic color gamut information (white_primary_x, white_primary_y) may include specific information capable of estimating the coordinates on the achromatic color gamut. The arbitrary achromatic color gamut information (white_primary_x, white_primary_y) may be used only when the color temperature designation flag information field is set to "1". The arbitrary achromatic color gamut information may indicate a difference between the achromatic color gamut coordinate dependent upon a predetermined color temperature and the achromatic color gamut coordinate dependent upon an arbitrary color temperature.

The reference gamut information (color_gamut) may indicate the standard color gamut capable of representing a color of the UHD broadcast content. The reference gamut information (color_gamut) may indicate the color expression range of the display and/or the position of a reference color (Red, Green, Blue) on the color gamut.

The arbitrary color gamut coordinates information (color_primary_g_y, color_primary_g_y, color_primary_g_x, color_primary_g_y, color_primary_b_x, color_primary_b_y) may indicate x-y coordinates of red, green, and blue in the arbitrary color gamut when the arbitrary color gamut instead of the standard color gamut is designated. The arbitrary color gamut coordinates information (color_primary_g_y, color_primary_g_y, color_primary_g_x, color_primary_g_y, color_primary_b_x, color_primary_b_y) may indicate whether the display unit of the receiving apparatus includes a target gamut. The arbitrary color gamut coordinates information (color_primary_g_y, color_primary_g_y, color_primary_g_x, color_primary_g_y, color_primary_b_x, color_primary_b_y) may denote a binary absolute value between 0 and 1. The arbitrary color gamut coordinates information (color_primary_g_y, color_primary_g_y, color_primary_g_x, color_primary_g_y, color_primary_b_x, color_primary_b_y) may indicate a difference between the x-and-y coordinates of red, green and blue on the standard color gamut and the x-and-y coordinates of red, green, and blue on the arbitrary color gamut. The arbitrary color gamut coordinates information may be used in the process for defining the arbitrary color gamut when the standard color gamut based on the reference gamut information insufficiently indicates the color expression range of the display appropriate for the UHD broadcast content.

The coefficient number information (number_of_coeff) may indicate the number of coefficients used for color gamut conversion when the standard color gamut insufficiently indicates the color expression range of the display appropriate for the UHD broadcast content and thus the arbitrary color gamut is defined. That is, assuming that the conversion to the arbitrary color gamut on the basis of the standard color gamut is achieved, the coefficient number information (number_of_coeff) may indicate the number of coefficients used for such conversion.

If conversion to the arbitrary color gamut on the basis of the standard color gamut is achieved, the gamut mapping coefficient information (gamut_mapping_coeff[i]) may indicate the coefficient used for such conversion. For example, conversion to the arbitrary color gamut may be achieved using the following expression.

$$\begin{pmatrix} r' \\ g' \\ b' \end{pmatrix} = \begin{pmatrix} coeff[0] & coeff[1] & coeff[2] \\ coeff[3] & coeff[4] & coeff[5] \\ coeff[6] & coeff[7] & coeff[8] \end{pmatrix} \begin{pmatrix} r \\ g \\ b \end{pmatrix}$$ [Expression]

In this case, the color gamut may be converted using another conversion equation.

FIG. 4 illustrates digital values of minimum reference luminance and digital values of maximum reference luminance, that are calculated by an EOTF (Electro Optical Transfer Function) function according to an embodiment of the present invention.

Referring to FIG. 4, assuming that a total number of bits appearing in an image is 8, a digital value of the minimum reference luminance may denote "16", and a digital value of the maximum reference luminance may denote "235". Assuming that a total number of bits appearing in an image is 10, a digital value of the minimum reference luminance may denote "64", and a digital value of the maximum reference luminance may denote "940". Assuming that a total number of bits appearing in an image is 12, a digital value of the minimum reference luminance may denote "256", and a digital value of the maximum reference luminance may denote "3760".

The digital value of the minimum reference luminance and the digital value of the maximum reference luminance can be represented by the following expressions.

$$L_B = a \cdot b^\gamma$$

$$L_W = a \cdot (1+b)^\gamma$$

In the above expressions, "L_B" may be achieved by applying "V=0" to the above-mentioned EOTF equation, and "L_W" may be achieved by applying "V=1" to the above-mentioned EOTF equation. In the above expressions, "L_W" may denote a digital value corresponding to maximum reference luminance, "L_B" may denote a digital value corresponding to minimum reference luminance, "V" may denote a value of a video signal normalized to any of values interposed between 0 and 1, "a" may denote a gain, and "b" may denote an offset.

FIG. 5 illustrates coordinates of white_color based on each color temperature designated in CIE 1931 standard color gamut according to an embodiment of the present invention.

Referring to FIG. 5, assuming that a predetermined color temperature is D65, x and y coordinates of white color in the CIE 1931 standard color gamut may indicate 0.3127 and 0.3290. In this case, a bit stream may denote '0000'. Assuming that the predetermined color temperature is 9300K, x and y coordinates of the white color on the CIE 1931 standard color gamut may respectively indicate 0.2831 and 0.2971. In this case, the bit stream may denote '0001'. The bit streams (0010 to 1000) may denote reserved values. The bit streams (1001 to 1111) may denote user private values.

FIG. 6 illustrates a standard color gamut defined by reference gamut information (color_gamut) according to an embodiment of the present invention.

If the bit stream is set to '0000', this means that the standard color gamut is BT.709. If the bit stream is set to '0001', this means that the standard color gamut is DCI-P3. If the bit stream is set to '0010', this means that the standard color gamut is BT.2020. The bit streams (0011 to 1000) may denote reserved values. The bit streams (1001 to 1111) may denote user private values.

FIG. 7 illustrates an event information table (EIT) according to an embodiment of the present invention.

Referring to FIG. 7, the EIT (Event Information Table) according to one embodiment a table_id field, a section_syntax_indicator field, a private_indicator field, a section_length field, a source_id field, a version_number field, a current_next_indicator field, a section_number field, a last section number field, a protocol_version field, a num_events_in_section field, an event_id field, a start_time field, an ETM_location field, a length_in_seconds field, a title_length field, a title_text( ) field, a descriptors_length field, a descriptor( ) field and/or a CRC_32 field.

The table_id field may identify that the corresponding table is an EIT (Event Information Table).

The section_syntax_indicator field may be a 1-bit field that is set to '1' so as to indicate a long shape of the MPEG-2 private_section table.

The private_indicator field may be a 1-bit field.

The section_length field may indicate the length of a table section located behind this field using the number of bytes.

The source_id field may indicate a source ID (source id) of a virtual channel through which an event written in the corresponding section is transmitted.

The version_number field may be a 5-bits field indicating a version number of the table.

The current_next_indicator field may be a 1-bit field, and may indicate whether the current table can be applied at a current time or in a subsequent process.

The section_number field may indicate the number of the section.

The last_section_number field may identify the number of the last section.

The protocol_version field may have a function for allowing a current table type configured to transmit a parameter different from the parameter defined in the current protocol in the future.

The num_events_in_section field may indicate the number of events contained in the corresponding table section.

The event_id field may identify a specific number indicating the written event. In this case, the specific number may serve as some parts of the event (ETM_id).

The start_time field may indicate the start time of the corresponding event on the basis of the GPS second. The value indicating the start time of an event for use in the virtual channel may be higher than a value indicating the end time of an on-air event. The end time of the event may be defined as the sum of the event start time and a specific value obtained when the event length is designated as a time value.

The ETM_location field may indicate the presence or absence of a text message extended for a channel, event or data event.

The length_in_seconds field may indicate a duration time of the event on the basis of second.

The title_length field may indicate the length of a title text (title text). If the corresponding field is set to zero (0), this means that no title is present in the corresponding event.

The title_text( ) field may indicate a title of the event in the form of a multiple string structure.

The descriptors_length field may indicate a total length of the event descriptor (descriptor( )) to be written in a subsequent process.

The descriptor( ) field may be a descriptor loop located in the table. The descriptor loop may include an additional descriptor. Zero or more descriptors may be contained in the EIT. The corresponding descriptor may correspond to the event level descriptor used to describe information applied to each event. The display information metadata according to one embodiment may be contained in the event level descriptor and then transmitted. If the display information metadata according to one embodiment is contained in the EIT event level descriptor and then transmitted, the receiving apparatus may determine whether metadata for content color enhancement is contained in the event level, and may determine whether to accommodate the corresponding content. The descriptor including the display information metadata may be referred to as a color adjustment information descriptor, and a detailed description thereof will hereinafter be described. The UHD program information descriptor for identifying the UHD broadcast service including the display information metadata may be contained in the EIT and then transmitted, and a detailed description thereof is as follows.

The CRC_32 field may include a CRC value capable of checking integrity of data. The CRC value may guarantee that the value of zero (0) is output from a register contained in the decoder defined in "Annex A of ISO-13818-1 "MPEG-2 Systems" [13]", after completion of the operation for processing the entire EIT section.

FIG. 8 illustrates the color management information descriptor (UHD_color_management_info_descriptor( )) according to an embodiment of the present invention.

Referring to FIG. 8, the color management information descriptor (UHD_color_management_info_descriptor( )) may include a descriptor_tag field, a descriptor_length field, a number_of_color_info field, and/or a color_management_metadata( ) field.

The descriptor_tag field may indicate that the corresponding descriptor is the color management information descriptor (UHD_color_management_info_descriptor( )).

The descriptor_length field may indicate the length of the corresponding descriptor.

The number_of_color_info field may indicate the number of display information metadata parts contained in the corresponding descriptor. If several color enhancement modes associated with one event are present, several display information metadata parts may be present.

The color_management_metadata( ) field may indicate display environment information appropriate for the UHD broadcast content. The corresponding field may be referred to as display information metadata, and a detailed description thereof will hereinafter be described.

FIG. 9 illustrates display information metadata (color_management_metadata( )) contained in the color management information descriptor (UHD_color_management_info_descriptor( )) according to an embodiment of the present invention.

Referring to FIG. 9, the color management information descriptor (UHD_color_management_info_descriptor( )) according to one embodiment may include gamut designation flag information (gamut_mapping_flag), minimum reference luminance information (reference_black_luminance_level), maximum reference luminance information (reference_white_luminance_level), reference gamut information (color_gamut), and/or arbitrary color gamut coordinates information (color_primary_r_x, color_primary_r_y, color_primary_g_x, color_primary_g_y, color_primary_b_x, color_primary_b_y).

The color management information descriptor (UHD_color_management_info_descriptor( )) according to one embodiment may include color temperature designation flag information (white_adjustment_flag), EOTF gamma index information (EOTF gamma), reference achromatic color gamut information (reference_white_color_temperature), arbitrary achromatic color gamut information (white_primary_x, white_primary_y), coefficient number information (number_of_coeff) and/or gamut mapping coefficient information (gamut_mapping_coeff[i]).

If necessary, detailed description of information contained in a color management information descriptor (UHD_color_management_info_descriptor( )) may be replaced with color information metadata (color_management_info(payloadSize)) contained in the above-mentioned SEI (Supplemental Enhancement Information) message and then transmitted.

In accordance with one embodiment, several display information metadata parts associated with one event may be present. That is, the display information metadata is not simultaneously applied to single UHD broadcast content, but the display information metadata may be independently applied according to time or the presence or absence of the inserted content. In this case, there is a need to determine whether UHD broadcast content can be accommodated in the display unit of the apparatus of receiving UHD broadcast signals. For this purpose, according to one embodiment, a transmission end may indicate not only luminance range information of the UHD broadcast content and color gamut information of the UHD broadcast content. If the additional color enhancement is present, (gamut_mapping_flag=1), the arbitrary color gamut coordinates information is transmitted, such that it may be possible to determine whether the corresponding content can be implemented within the physical expression range of the display unit of the receiving apparatus.

FIG. 10 illustrates UHD program information descriptor according to an embodiment of the present invention.

Referring to FIG. 10, the UHD program information descriptor (UHD program_info_descriptor( )) according to one embodiment may include a descriptor_tag field, a descriptor_length field, and/or an UHD_service_type field.

The descriptor_tag field may identify that the corresponding descriptor is the luminance range conversion information descriptor.

The descriptor_length field may indicate the length of the corresponding descriptor.

The UHD_service_type field provides information regarding the UHD service types, such that it can provide a variety of UHD services. For example, the UHD service types may include UHD1 (4K) and UHD2 (8K). In addition, the UHD service types may be classified according to qualities, and may be arbitrarily designated by the user.

The UHD program information descriptor may identify a specific UHD broadcast service including the display information metadata.

FIG. 11 illustrates an UHD_service_type field contained in an UHD program information descriptor (UHD program_info_descriptor( )) according to an embodiment of the present invention.

Referring to FIG. 11, if the UHD service_type field according to one embodiment is set to 0000, this means the presence of an UHD1 service. If the UHD service_type field is set to 0001, this means the presence of an UHD2 service.

If the UHD service_type field is set to 1000 to 1111, this means the presence of a specific service designated by the user.

For example, the user may allocate the value of "1001" (color enhanced UHD1 (4K) service) to the UHD_service_type field, so as to indicate the use of color enhancement. In this case, the receiving apparatus can recognize that the corresponding service is the UHD broadcast service including the above-mentioned display information metadata.

In accordance with one embodiment, "1001" (clor enhanced UHD 1 (4K) service) is allocated to the UHD_service_type field, such that this means the fact that the display environment can be adjusted using metadata. If "0000" (UHD 1 service) is allocated to the UHD_service_type, information regarding the presence or absence of the color management information descriptor (UHD color_management_info_descriptor( )) in the EIT is confirmed, such that it may be possible to determine information whether the display environment of the receiving apparatus can be managed or adjusted using the metadata.

A display environment desired by the content manufacturer can be expressed in the display unit of a TV viewer. In accordance with one embodiment, the display environment desired by a content manufacturer (acting as a content provider) may determine whether the display environment desired by the content manufacturer can be reproduced. The operation for determining whether the display information metadata is used may be determined at the current time or may also be determined in a subsequent process in future, and the receiver may be preset for a situation such as a reserved recording function, etc.

FIG. 12 illustrates a Terrestrial Virtual Channel Table (TVCT) according to an embodiment of the present invention.

Referring to FIG. 12, a Terrestrial Virtual Channel Table (TVCT) according to one embodiment a table id field, a section_syntax_indicator field, a private_indicator field, a section_length field, transport_stream_id field, a version_number field, a current_next_indicator field, a section_number field, a last_section_number field, a protocol_version field, a num_channels_in_section field, a short_name field, a major_channel_number field, a minor_channel_number field, a modulation mode field, a carrier_frequency field, a channel TSID field, a program_number field, an ETM_location field, an access_controlled field, a hidden field, a hide_guide field, a service_type field, a source_id field, a descriptors_length field, and/or a descriptor( ) field.

The table_id field may identify the table. The table shown in FIG. 8 is a TVCT such that the field can identify the table. The table shown in FIG. 9 is a TVCT, such that the table_id value may be set to 0x08.

The section_syntax_indicator field may be a 1-bit field to indicate the long shape of the MPEG-2 private_section table. (This 5-bit field shall be set to '1' m always indicate the "long" form of the MPEG-2 private_section table.)

The private_indicator field is a 1-bit field to which the value of 1 is allocated. (This 1-bit field shall be set to '1'.)

The section_length may indicate the length of a table section located behind using the number of bytes. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

The transport_stream_id field may indicate an identifier (ID) of the MPEG-2 transport stream (TS) contained in the table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field may be a 5-bits field indicating the version number of the table. (This 5-bit field is the version number of the PSIP section. The version number shall be incremented by 1 modulo 32 when a change in the information carried within the PSIP section occurs. When the current next indicator is set to '0', then the version number shall be that of the next applicable PSIP section with the same table_id, table_id_extension, and section_number.)

The current_next_indicator field may be a 1-bit field to indicate whether this table can be applied either at a current time or in a subsequent process. (A 1-bit field, which when set to '1' indicates that the PSIP section sent is currently applicable. When the current next indicator is set to '1', then the version_number shall be that of the currently applicable PSIP section. When the bit is set to '0', it indicates that the PSIP_section sent is not yet applicable and shall be the next PSIP section with the same section_number, table_id_extension, and table_id to become valid.)

The section_number field may indicate a number of the section. (This 8-bit field gives the number of the PSIP section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

The last_section_number field may identify the number of the last section. (This 8-bit field specifies the number of the last section (that is, the section with the highest section_number) of the PSIP table of which this section is a part. Its scope is the same as for the section_number field.)

The protocol_version field may have a function for allowing a current table type configured to transmit a parameter different from the parameter defined in the current protocol in the future. (An 8-bit unsigned integer field whose function is to allow, in the future, this table type to carry parameters that may be structured differently than those defined in the current protocol. At present, the only valid value for protocol_version is zero. Non-zero values of protocol) version may be used by a future version of this standard to indicate structurally different tables.)

The num_channels_in_section field may indicate the number of resolutions of a virtual channel. (The num_channels_in_section field in ATSC Cable Virtual Channel table CVCT table sections is an eight-bit field that indicates the number of virtual channel definitions to follow in the table section.)

The short_name field may be a 112-bits field indicating a short name for use in a virtual channel. (The short_name field is a 112-bit field in ATSC CVCT table sections that gives the short name for the virtual channel. Each letter of the short name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the allocated number of bits has been reached.)

The major_channel_number field may indicate the number of major channels related to a virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field may indicate the number of minor channels related to a virtual channel. (A 10-bit number in the range 0 to 999 that represents the "minor" or "sub"channel number. This field, together with major_channel_number, performs as a two-part channel number, where minor_channel_number represents the second or right-hand part of the number. When the service_type is analog television, minor_channel_number shall be set to 0.)

The modulation_mode field may indicate a modulation scheme of a transport carrier of a virtual channel. (The modulation_mode is an eight-bit field in a virtual channel entry tells receivers the modulation used to transmit individual channels.)

The carrier_frequency field may transmit carrier frequency information used by a transmission (Tx) virtual channel. (The carrier frequency is a 32-bit field that transmits the carrier frequency used by the transport carrying the virtual channel.)

The channel_TSID field may indicate an MPEG-2 transport stream (TS) ID regarding a transport stream (TS) transmitting the MPEG-2 program related to a virtual channel. (The channel_TSID is a 16-bit unsigned integer field that gives the transport_stream_id of the channel that carriers (or for inactive channels, will carry) the virtual channel.)

The program_number field may identify each program service contained in a TS (transport stream) or a virtual channel. (The program_number is a 16-bit unsigned integer that uniquely identifies each program service (or virtual channel) present in a transport stream.)

The ETM_location field may indicate the presence or absence of a test message extended for a channel, an event, or a data event. (The ETM_location field denotes whether there is an extended text message for the channel (Channel Extended Text table or CETT), event (Event Extended Text table) or data event (Data Extended Text table).)

The access_controlled field may indicate whether an event related to the corresponding virtual channel can be controlled. (When access_controlled is set to '1', means that events associated with this virtual channel may be access controlled. When set to '0', access to event is not controlled.)

The hidden field may indicate whether the corresponding channel can be accessed by direct entry (or a field, attribute, entity) of the virtual channel number. (When hidden is set to '1', means the channel cannot be accessed by direct entry of the virtual channel number. When set to '0', virtual can be accessed by direct entry.)

The hide_guide field may indicate whether the corresponding channel can be accessed by direct entry (or a field, attribute, entity) of the virtual channel number. (When hide_guide is set to '1', means the channel cannot be accessed by direct entry of the virtual channel number. When set to '0', virtual can be accessed by direct entry.)

The service_type field may identify the service type that is set in the virtual channel. (The service_type is a 6-bit enumerated field that identifies the type of service set in the virtual channel.) This field relates to one embodiment of the UHD service, and the service_type field may be set to a parameterized service(0x07), an extended parameterized service(0x09) or a new DTV service(0x10). The abovementioned service names and values relate to one embodiment, and may also be set to other names or values as necessary.

The source_id field may indicate an 16-bits unsigned integer number, and may indicate the programming source associated with the virtual channel. (A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length field may transmit the length of bytes contained in the next descriptor field (The descriptors_length field is a 10-bit unsigned integer field that signals the length in bytes of the descriptor field to follow. If there are no descriptors present, zero would be appropriate.)

The descriptor( ) field may be a descriptor loop located in the table. The descriptor loop may include an additional descriptor.

Figures 13, 14:
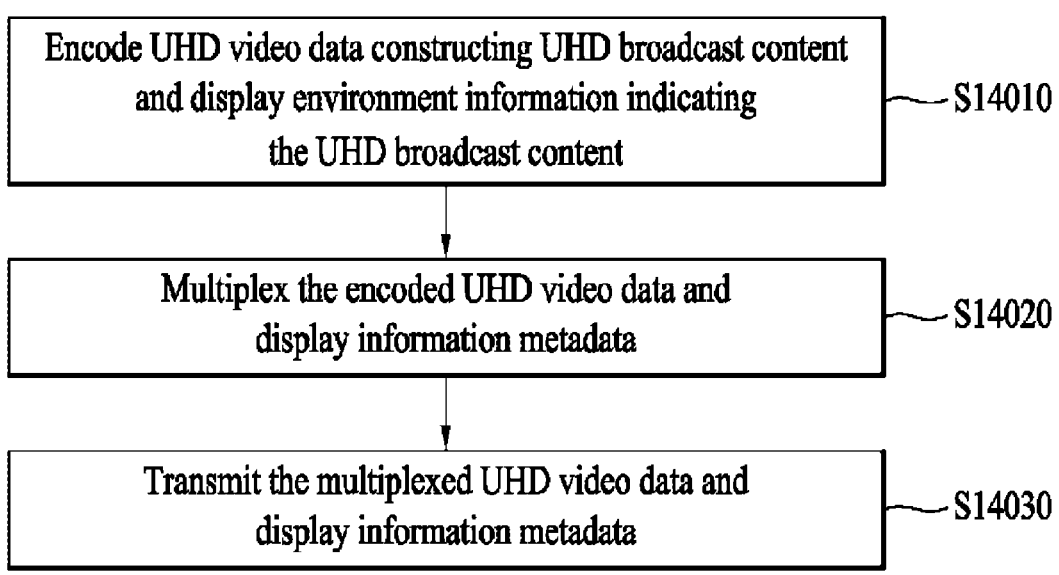
FIG. 13 illustrates a descriptor for identifying the UHD broadcast server according to an embodiment of the present invention.
FIG. 14 is a flowchart illustrating a method for transmitting an UHD broadcast signal according to an embodiment of the present invention.

FIG. 13 illustrates a descriptor for identifying the UHD broadcast server according to an embodiment of the present invention.

Referring to FIG. 13, specific information indicating whether the UHD video service is implemented in TVCT of the present invention may be signaled by the following method.

If the service_type field is set to 0x07, the video service can be written. Through information contained in the stream_info_details( ) field transmitted through the component list descriptor, specific information indicating whether the corresponding stream can be decoded or reproduced by the receiving apparatus can be determined. In addition, information regarding the UHD service can be provided through the UHD descriptor and/or the service location descriptor.

If the service_type field is set to 0x09, the parameterized service descriptor may be additionally used, and detailed information regarding the UHD service can be supplied using the above result. In addition, information regarding the UHD service can be provided through the component list descriptor and/or the service location descriptor.

If the service_type field is set to 0x10, information regarding the UHD service can be provided through the UHD descriptor and/or the service location descriptor.

FIG. 14 is a flowchart illustrating a method for transmitting an UHD broadcast signal according to an embodiment of the present invention.

Referring to FIG. 14, according to one embodiment of the present invention, the UHD broadcast signal may be transmitted through the following steps. First, a transmitter may encode UHD video data and display information metadata in step S14010. In this case, UHD video data may be contained in the UHD broadcast content, and display information metadata may indicate display environment information appropriate for the UHD broadcast content. Detailed description regarding the display information metadata has already been disclosed in FIG. 3.

In the next step, the transmitter may multiplex the encoded UHD video data and the display information metadata in step S14020. In this case, the display information metadata may not be multiplexed with the UHD video data.

Subsequently, the transmitter may transmit the multiplexed UHD video data and the display information metadata in step S14030. In this case, the multiplexed UHD video data and/or the display information metadata may be transmitted through at least one of a terrestrial broadcast network, a cable network, and an Internet Protocol (IP) network.

In accordance with another embodiment of the present invention, the display information metadata may include at least one of minimum reference luminance information indicating minimum reference luminance needed to display the UHD broadcast content, maximum reference luminance information indicating maximum reference luminance needed to display the UHD broadcast content, and/or an EOTF (Electro Optical Transfer Function) gamma index information indicating a gamma index used in the EOTF configured to calculate luminance appearing in the display unit of the apparatus for receiving the broadcast signal. Detailed description of the minimum reference luminance information, the maximum reference luminance information, and the EOTF gamma index information has already been disclosed in FIG. 3.

In accordance with another embodiment of the present invention, display information metadata may include at least one of reference achromatic color gamut information indicating the position associated information on the achromatic color gamut dependent upon a predetermined color temperature, color temperature designation flag information indicating whether the arbitrary color temperature is designated, and/or arbitrary achromatic color gamut information indicating the position associated information on the achromatic color gamut dependent upon the arbitrary color temperature when the arbitrary color temperature is designated. Detailed description of the above reference achromatic color gamut information, color temperature designation flag information, and arbitrary achromatic color gamut information has already been disclosed in FIG. 3.

In accordance with another embodiment, the display information metadata may include at least one of gamut designation flag information indicating whether an arbitrary gamut is designated, reference gamut information indicating the standard color gamut capable of expressing the content color, arbitrary color gamut coordinates information indicating the coordinates of red, green, and blue in the arbitrary color gamut when the arbitrary color gamut instead of the standard color gamut is designated, coefficient number information indicating the number of coefficients used for conversion when the conversion to the arbitrary color gamut on the basis of the standard color gamut is achieved, and gamut mapping coefficient information indicating the coefficient used for such conversion to the above arbitrary color gamut. Detailed description of the above gamut designation flag information, reference gamut information, arbitrary color gamut coordinates information, coefficient number information, and gamut mapping coefficient information has already been disclosed in FIG. 3.

In accordance with another embodiment of the present invention, the display information metadata may be contained in the SEI message and then transmitted. The display information metadata may be contained in the event information table (EIT) including information regarding each event constructing the UHD broadcast content, and then transmitted. Detailed description thereof has already been disclosed in FIGS. 2, 3, and 7.

In accordance with another embodiment of the present invention, display information metadata may be contained in an event level descriptor that indicates specific information applied to each event in the event information table (EIT), and then transmitted. Detailed description thereof has already been disclosed in FIGS. 7 to 9.

In accordance with another embodiment of the present invention, the event information table (EIT) may further include the UHD program information descriptor configured to identify the UHD broadcast service including the display information metadata. Detailed description thereof has already been disclosed in FIG. 7 and FIGS. 10 to 13.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The embodiments of the present invention can be applied to the entire broadcasting industry.

The invention claimed is:
1. An apparatus for receiving an Ultra High Definition (UHD) broadcast signal comprising:
a receiver configured to receive an UHD broadcast signal that includes UHD broadcast content and display information metadata indicating display environment information appropriate for the UHD broadcast content,
wherein the display information metadata includes reference white color temperature information indicating coordinates of a white point on a standard color space according to a standard color temperature, arbitrary color temperature flag information indicating whether an arbitrary color temperature is used and arbitrary white color temperature information indicating coordinates of a white point on the standard color space according to an arbitrary color temperature;
a decoder configured to decode the received UHD broadcast content and the display information metadata;
a controller configured to adjust a display environment of the receiving apparatus to another display environment appropriate for the UHD broadcast content using the display information metadata; and
a display configured to display the UHD broadcast content.

2. The apparatus according to claim 1, wherein the display information metadata includes at least one of minimum reference luminance information indicating minimum luminance from among a plurality of recommended display luminance ranges needed to display the UHD broadcast content under an optimum display environment, maximum reference luminance information indicating maximum luminance from among a plurality of recommended display luminance ranges needed to display the UHD broadcast content under the optimum display environment, and EOTF (Electro Optical Transfer Function) gamma index information indicating a gamma index used in an EOTF needed to calculate luminance appearing in the display of the receiving apparatus.

3. The apparatus according to claim 2, wherein:
the display information metadata is contained in a supplemental enhancement information (SEI) message and then transmitted, or is contained in an event information table (EIT) including information regarding each event constructing UHD broadcast content and then transmitted.

4. The apparatus according to claim 3, wherein:
the display information metadata is contained in an event level descriptor that describes information applied to each event in the event information table (EIT), and then transmitted.

5. The apparatus according to claim 3, wherein the event information table (EIT) further includes:
an UHD program information descriptor configured to identify an UHD broadcast service including the display information metadata.

6. The apparatus according to claim 1, wherein the display information metadata includes at least one of gamut designation flag information indicating whether an arbitrary gamut is designated, reference gamut information indicating a standard color gamut indicating a color of content, arbitrary color gamut coordinates information indicating coordinates of red, green, and blue on an arbitrary color gamut when the arbitrary color gamut instead of the standard color gamut is designated, coefficient number information indicating the number of coefficients used in conversion when the conversion to the arbitrary color gamut on the basis of the standard color gamut is achieved, and gamut mapping coefficient information indicating a coefficient used for conversion to the arbitrary color gamut.

7. The apparatus according to claim 6, wherein:
the display information metadata is contained in a supplemental enhancement information (SEI) message and then transmitted, or is contained in an event information table (EIT) including information regarding each event constructing UHD broadcast content and then transmitted.

8. The apparatus according to claim 1, wherein:
the display information metadata is contained in a supplemental enhancement information (SEI) message and then transmitted, or is contained in an event information table (EIT) including information regarding each event constructing UHD broadcast content and then transmitted.

9. A method for transmitting an Ultra High Definition (UHD) broadcast signal by a transmitter, comprising:
encoding UHD video data constructing an UHD broadcast content and display information metadata indicating display environment information appropriate for the UHD broadcast content;
wherein the display information metadata includes reference white color temperature information indicating coordinates of a white point on a standard color space according to a standard color temperature, arbitrary color temperature flag information indicating whether an arbitrary color temperature is used and arbitrary white color temperature information indicating coordinates of a white point on the standard color space according to an arbitrary color temperature;
multiplexing the encoded UHD video data and the display information metadata; and
transmitting the multiplexed UHD video data and the multiplexed display information data.

10. The method according to claim 9, wherein the display information metadata includes at least one of minimum reference luminance information indicating minimum luminance from among a plurality of recommended display luminance ranges needed to display the UHD broadcast content under an optimum display environment, maximum reference luminance information indicating maximum luminance from among a plurality of recommended display luminance ranges needed to display the UHD broadcast content under the optimum display environment, and EOTF (Electro Optical Transfer Function) gamma index information indicating a gamma index used in an EOTF needed to calculate luminance appearing in a display of a broadcast signal receiver.

11. The method according to claim 10, wherein:
the display information metadata is contained in a supplemental enhancement information (SEI) message and then transmitted, or is contained in an event information table (EIT) including information regarding each event constructing UHD broadcast content and then transmitted.

12. The method according to claim 11, wherein:
the display information metadata is contained in an event level descriptor that describes information applied to each event in the event information table (EIT), and then transmitted.

13. The method according to claim 11, wherein the event information table (EIT) further includes:
an UHD program information descriptor configured to identify an UHD broadcast service including the display information metadata.

14. The method according to claim 9, wherein the display information metadata includes at least one of gamut designation flag information indicating whether an arbitrary gamut is designated, reference gamut information indicating a standard color gamut indicating a color of content, arbitrary color gamut coordinates information indicating coordinates of red, green, and blue on an arbitrary color gamut when the arbitrary color gamut instead of the standard color gamut is designated, coefficient number information indicating the number of coefficients used in conversion when the conversion to the arbitrary color gamut on the basis of the standard color gamut is achieved, and gamut mapping coefficient information indicating a coefficient used for conversion to the arbitrary color gamut.

15. The method according to claim 14, wherein:
the display information metadata is contained in a supplemental enhancement information (SEI) message and then transmitted, or is contained in an event information table (EIT) including information regarding each event constructing UHD broadcast content and then transmitted.

16. The method according to claim 9, wherein:
the display information metadata is contained in a supplemental enhancement information (SEI) message and then transmitted, or is contained in an event information table (EIT) including information regarding each event constructing UHD broadcast content and then transmitted.

* * * * *